(12) United States Patent
Nakagomi

(10) Patent No.: US 11,926,751 B2
(45) Date of Patent: Mar. 12, 2024

(54) INKJET TEXTILE PRINTING INK

(71) Applicant: KYOCERA Document Solutions Inc., Osaka (JP)

(72) Inventor: Masatoshi Nakagomi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 329 days.

(21) Appl. No.: 17/382,957

(22) Filed: Jul. 22, 2021

(65) Prior Publication Data

US 2022/0033670 A1  Feb. 3, 2022

(30) Foreign Application Priority Data

Jul. 29, 2020 (JP) ................. 2020-128441

(51) Int. Cl.
| | |
|---|---|
| *C09D 11/328* | (2014.01) |
| *C08L 33/26* | (2006.01) |
| *C08L 39/04* | (2006.01) |
| *C08L 67/00* | (2006.01) |
| *D06P 5/30* | (2006.01) |

(52) U.S. Cl.
CPC ............ *C09D 11/328* (2013.01); *C08L 33/26* (2013.01); *C08L 67/00* (2013.01); *D06P 5/30* (2013.01); *C08L 39/04* (2013.01); *C08L 2207/53* (2013.01)

(58) Field of Classification Search
CPC ... C09D 11/328; C09D 11/104; C09D 11/107; C09D 167/00; C08L 33/26; C08L 67/00; C08L 39/04; C08L 2207/53; D06P 5/30; D06P 1/0016; D06P 1/0052; D06P 1/44
See application file for complete search history.

(56) References Cited

U.S. PATENT DOCUMENTS

| | | | |
|---|---|---|---|
| 7,354,960 B2 | 4/2008 | Ninomiya et al. | |
| 2003/0055115 A1* | 3/2003 | Ninomiya | C09D 11/30 516/77 |
| 2005/0043435 A1 | 2/2005 | Ninomiya et al. | |
| 2007/0103528 A1* | 5/2007 | Pearl | C09D 11/36 347/101 |
| 2012/0247768 A1* | 10/2012 | Ballard | C09K 8/5756 507/265 |
| 2017/0248860 A1* | 8/2017 | Nishitera | G03G 9/0825 |
| 2018/0223475 A1* | 8/2018 | Tabayashi | D06P 5/006 |
| 2019/0187579 A1* | 6/2019 | Uemura | G03G 9/09321 |
| 2019/0390078 A1* | 12/2019 | Moriyama | C08G 18/4808 |

FOREIGN PATENT DOCUMENTS

| | | | |
|---|---|---|---|
| JP | 05271598 A | * | 10/1993 |
| JP | 2000-109733 A | | 4/2000 |
| WO | 03/055951 A1 | | 7/2003 |

OTHER PUBLICATIONS

Britannica, The Editors of Encyclopaedia. "polyester". Encyclopedia Britannica, 2009, https://www.britannica.com/science/polyester. Accessed Jun. 15, 2023. (Year: 2009).*
Grasmeder, John. "Polymer Crystallinity—HPP Explained (Part 3)." Victrex, Nov. 20, 2017, www.victrex.com/en/blog/2017/polymer-crystallinity-hpp-explained-part-3. (Year: 2017).*
English Machine Translation of JPH05271598A ("Machine_Translation_Arita_JP_H05271598_A") (Year: 1993).*

* cited by examiner

*Primary Examiner* — Jennifer A Smith
*Assistant Examiner* — Jeffrey Eugene Barzach
(74) *Attorney, Agent, or Firm* — Studebaker & Brackett PC

(57) ABSTRACT

An inkjet textile printing ink includes coloring particles and an aqueous medium. The coloring particles each include a core and a shell layer covering the core. The core contains a polyester resin and a dye. The shell layer contains a specific resin with a non-ring-opened oxazoline group and an amide ester group. The polyester resin preferably includes a non-crystalline polyester resin.

7 Claims, No Drawings

INKJET TEXTILE PRINTING INK

INCORPORATION BY REFERENCE

The present application claims priority under 35 U.S.C. § 119 to Japanese Patent Application No. 2020-128441, filed on Jul. 29, 2020. The contents of this application are incorporated herein by reference in their entirety.

BACKGROUND

The present disclosure relates to an inkjet textile printing ink.

An inkjet textile printing ink must have excellent ejection stability and be capable of forming a textile print with excellent washing fastness. An inkjet textile printing ink including pigment particles with core-shell structures is proposed as an example of an inkjet textile printing ink that can form a textile print with excellent washing fastness. A method by which textile printing is performed with an inkjet textile printing ink containing a polymer with a non-ring-opened oxazoline group and then the formed textile print is heated to cross-link the polymer with the non-ring-opened oxazoline group is also proposed for forming a textile print with excellent washing fastness.

SUMMARY

An inkjet textile printing ink according to an aspect of the present disclosure includes coloring particles and an aqueous medium. The coloring particles each include a core and a shell layer covering the core. The core contains a polyester resin and a dye. The shell layer contains a specific resin with a non-ring-opened oxazoline group and an amide ester group.

DETAILED DESCRIPTION

The following describes an embodiment of the present disclosure. Note that in the present specification, a measurement value of volume median diameter ($D_{50}$) refers to a value measured using a dynamic light scattering type particle size distribution analyzer (e.g., "ZETASIZER NANO ZS", product of Malvern Instruments Ltd.) unless otherwise stated. The term "(meth)acryl" is used as a generic term for both acryl and methacryl. One type of each component described in the present specification may be used independently, or two or more types may be used in combination.

<Inkjet Textile Printing Ink>

An inkjet textile printing ink (may be referred to in the following as an ink) according to the embodiment of the present disclosure includes coloring particles and an aqueous medium. The coloring particles each include a core and a shell layer covering the core. The core contains a polyester resin and a dye. The shell layer contains a specific resin with a non-ring-opened oxazoline group and an amide ester group.

The ink of the present disclosure is suitable as an ink used for direct textile printing (textile printing in which an ink is directly ejected onto a textile printing target). The textile printing target for which the ink of the present disclosure is used may be woven fabric or knitted work. Examples of the textile printing target include cotton cloth, silk cloth, hemp cloth, acetate cloth, rayon cloth, nylon cloth, polyurethane cloth, and polyester cloth. By containing the polyester resin, the coloring particles included in the ink of the present disclosure have excellent affinity with polyester cloth. As such, the textile printing target is preferably polyester cloth.

By including the above features, the ink of the present disclosure has excellent ejection stability and is capable of forming a textile print with excellent washing fastness. The reasons for this are surmised to be as follows. The ink of the present disclosure includes coloring particles each with a core-shell structure. The core containing the dye of each coloring particle is covered with a shell layer, so the dye is not exposed on the surface of the coloring particle. As such, the dye of a textile print formed by the ink of the present disclosure is not readily eluted when washed. Furthermore, the specific resin contained in the shell layers has a non-ring-opened oxazoline group. The non-ring-opened oxazoline group contained in the specific resin reacts with a carboxy group present on the surface of a textile printing target to form a covalent bond, thus improving the adhesion of the coloring particles to the textile printing target. Through the above, a textile print formed with the ink of the present disclosure has excellent washing fastness. Here, the coloring particles are formed by processing the cores with a polymer with a non-ring-opened oxazoline group, for example. The polymer with a non-ring-opened oxazoline group has a property of slowly cross-linking even at normal temperature. As such, an ink containing a polymer with a non-ring-opened oxazoline group by itself tends to degrade in ejection stability due to agglomeration of the polymer with a non-ring-opened oxazoline group. By contrast, the specific resin contained in the shell layers in the ink of the present disclosure forms a covalent bond with the polyester resin contained in the cores. As such, the molecules of the specific resin in the ink of the present disclosure are secured to the coloring particles and are not free in the aqueous medium. Furthermore, the specific resin in the ink of the present disclosure does not readily cause a cross-linking reaction because a portion of non-ring-opened oxazoline groups is consumed to form the above-described covalent bond. Through the above, the specific resin contained in the ink of the present disclosure does not readily agglomerate. As such, the ink of the present disclosure has excellent ejection stability.

In the ink of the present disclosure, the content ratio of the non-ring-opened oxazoline group as measured by gas chromatography-mass spectrometry is preferably at least 30 μmol/g and no greater than 100 μmol/g, and more preferably at least 40 μmol/g and no greater than 60 μmol/g. By setting the content ratio of the non-ring-opened oxazoline group to at least 30 μmol/g, the adhesion of the coloring particles to the textile printing target can be improved. As a result, the washing fastness of the textile print formed with the ink of the present disclosure can be further improved. By setting the content ratio of the non-ring-opened oxazoline group to no greater than 100 μmol/g, agglomeration of the coloring particles can be inhibited. As a result, the ejection stability of the ink of the present disclosure can be further improved.

[Coloring Particles]

The coloring particles each include the core and the shell layer covering the core. The content ratio of the coloring particles in the ink of the present disclosure is preferably at least 1.0% by mass and no greater than 25.0% by mass, and more preferably at least 4.0% by mass and no greater than 10.0% by mass.

The volume median diameter of the coloring particles is preferably at least 20 nm and no greater than 300 nm, and more preferably at least 80 nm and no greater than 200 nm. By setting the volume median diameter of the coloring particles to at least 20 nm, the coloring particles can be inhibited from agglomerating. By setting the volume median diameter of the coloring particles to no greater than 300 nm, the ejection stability of the ink of the present disclosure can be further improved.

(Cores)

The cores contain the polyester resin and a dye. The cores preferably contain only a polyester resin and the dye, but may further contain other components (e.g., an additive and a resin other than the polyester resin). The polyester resin in the cores forms a matrix. The dye is dispersed in the matrix formed by the polyester resin.

(Polyester Resin)

The polyester resin is obtained by polycondensing one or more polyhydric alcohols with one or more polybasic carboxylic acids. Examples of a polyhydric alcohol for synthesizing the polyester resin include dihydric alcohols (e.g., diol compounds or bisphenol compounds) and tri- or higher-hydric alcohols. Examples of a carboxylic acid for synthesizing the polyester resin include dibasic carboxylic acids and tri- or higher-basic carboxylic acids. Note that in the synthesis of the polyester resin, a polybasic carboxylic acid derivative (e.g., dimethyl polybasic carboxylate, anhydride of polybasic carboxylic acid, and halide polybasic carboxylate) capable of forming an ester bond by polycondensation may be used instead of a polybasic carboxylic acid.

Examples of the diol compounds include ethylene glycol, diethylene glycol, triethylene glycol, 1,2-propanediol, 1,3-propanediol, 1,4-butanediol, neopentyl glycol, 2-butene-1,4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol.

Examples of the bisphenol compounds include bisphenol A, hydrogenated bisphenol A, bisphenol A ethylene oxide adduct, and bisphenol A propylene oxide adduct.

Examples of the tri- or higher-hydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

A preferable polyhydric alcohol is bisphenol A propylene oxide adduct or ethylene glycol.

Examples of the dibasic carboxylic acids include maleic acid, fumaric acid, citraconic acid, itaconic acid, glutaconic acid, phthalic acid, isophthalic acid, sodium 5-sulfoisophthalate, terephthalic acid, napthalene dicarboxylic acids (e.g., 2,6-naphthalene dicarboxylic acid), cyclohexane dicarboxylic acid, adipic acid, sebacic acid, azelaic acid, malonic acid, succinic acid, alkyl succinic acids (e.g., n-butylsuccinic acid, isobutylsuccinic acid, n-octylsuccinic acid, n-dodecylsuccinic acid, and isododecylsuccinic acid), and alkenylsuccinic acids (e.g., n-butenylsuccinic acid, isobutenylsuccinic acid, n-octenylsuccinic acid, n-dodecenylsuccinic acid, and isododecenylsuccinic acid).

Examples of the tri- or higher-basic carboxylic acid include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylene carboxy propane, 1,2,4-cyclohexanetricarboxylic acid, tetra(methylene carboxy)methane, 1,2,7,8-octanetetracarboxylic acid, pyromellitic acid, and EMPOL trimer acid.

A preferable polybasic carboxylic acid is terephthalic acid, isophthalic acid, 2,6-naphthalene dicarboxylic acid, or sodium 5-sulfoisophthalate.

Examples of the polyester resin include a non-crystalline polyester resin and a crystalline polyester resin. The polyester resin is preferably a non-crystalline polyester resin. By the polyester resin including a non-crystalline polyester resin, a textile print with excellent elasticity can be formed with the ink of the present disclosure. By the cores in the ink of the present disclosure containing a non-crystalline polyester resin, the heating temperature in heat processing after image formation can be lowered.

The non-crystalline polyester resin has excellent affinity with an anthraquinone-based disperse dye. As such, by the polyester resin including the non-crystalline polyester resin and the dye including the anthraquinone disperse dye, the dispersibility of the non-crystalline polyester resin and the dye (anthraquinone disperse dye) in the cores can be improved.

The non-crystalline polyester resin can be obtained by introducing an irregular structure to a polyester resin to make it difficult for the polyester resin to form a crystalline structure. Examples of specific methods for introducing an irregular structure to a polyester resin include a method using a combination of two or more polyhydric alcohols and two or more polybasic carboxylic acids, a method using a polyhydric alcohol or a polybasic carboxylic acid with steric hindrance, and a method using a polyhydric alcohol (e.g., 1,3-propanediol) or a polybasic carboxylic acid with an odd carbon number.

The material of the polyester resin preferably contains an aromatic dicarboxylic acid and an aromatic alcohol. In this case, the content ratio of the aromatic dicarboxylic acid and the aromatic alcohol in the polyester material is preferably at least 50% by mass. By the material of the polyester resin containing an aromatic dicarboxylic acid and an aromatic alcohol, the affinity of the polyester resin and an oil-based dye (e.g., disperse dye) can be improved.

The polyester resin is preferably a non-crystalline polyester resin formed by materials of combination (a) or (b) as shown in the following.

Combination (a): dimethyl terephthalate (e.g., at least 20% by mass and no greater than 30% by mass), isophthalic acid (e.g., at least 15% by mass and no greater than 25% by mass), sodium 5-sulfoisophthalate (e.g., at least 1% by mass and no greater than 10% by mass), bisphenol A propylene oxide adduct (e.g., at least 25% by mass and no greater than 45% by mass), and ethylene glycol (e.g., at least 10% by mass and no greater than 20% by mass) Combination (b): dimethyl terephthalate (e.g., at least 10% by mass and no greater than 20% by mass), isophthalic acid (e.g., at least 10% by mass and no greater than 15% by mass), dimethyl 2,6-naphthalene dicarboxylate (e.g., at least 10% by mass and no greater than 20% by mass), sodium 5-sulfoisophthalate (e.g., at least 1% by mass and no greater than 10% by mass), bisphenol A propylene oxide adduct (e.g., at least 30% by mass and no greater than 40% by mass), and ethylene glycol (e.g., at least 10% by mass and no greater than 20% by mass)

The glass transition point (Tg) of the polyester resin is preferably at least 40° C. and no higher than 75° C. By setting the glass transition point of the polyester resin to at least 40° C., the preservation stability of the ink of the present disclosure can be improved. By setting the glass transition point of the polyester resin to no higher than 75° C., the adhesion of the coloring particles to a textile print target can be improved.

The content ratio of the polyester resin in the cores is preferably at least 50.0% by mass and no greater than 90.0% by mass, and more preferably at least 70.0% by mass and no greater than 85.0% by mass.

(Dye)

Examples of the dye include yellow dyes, orange dyes, red dyes, blue dyes, violet dyes, and black dyes. The dye is preferably a disperse dye. Examples of a yellow disperse dye include C.I. Disperse Yellow (42, 49, 76, 83, 88, 93, 99, 119, 126, 160, 163, 165, 180, 183, 186, 198, 199, 200, 224, or 237). Examples of an orange disperse dye include C.I. Disperse Orange (29, 30, 31, 38, 42, 44, 45, 53, 54, 55, 71, 73, 80, 86, 96, 118, or 119). Examples of a red disperse dye include C.I. Disperse Red (73, 88, 91, 92, 111, 127, 131, 143, 145, 146, 152, 153, 154, 179, 191, 192, 206, 221, 258, 283, 302, 323, 328, or 359). Examples of a violet disperse dye include C.I. Disperse Violet (26, 35, 48, 56, 77, or 97). Examples of a blue disperse dye include C.I. Disperse Blue (27, 54, 60, 73, 77, 79, 79:1, 87, 143, 165, 165:1, 165:2, 181, 185, 197, 225, 257, 266, 267, 281, 341, 353, 354, 358, 364, 365, 368, 359, or 360).

The dye is also preferably a dye suitable for thermal transfer. Examples of a yellow dye suitable for thermal transfer include C.I. Disperse Yellow (51, 54, or 60) and C.I. Solvent Yellow 114. Examples of an orange dye suitable for thermal transfer include C.I. Disperse Orange (5, 7, 20, or 23) and C.I. Solvent Orange 67. Examples of a red dye suitable for thermal transfer include C.I. Disperse Red (50, 53, 59, 60, 239, or 240) and C.I. Solvent Red 146. Examples of a violet dye suitable for thermal transfer C.I. Disperse Violet (8, 11, 17, 26, 27, 28, or 36). Examples of a blue dye suitable for thermal transfer include C.I. Disperse Blue (3, 5, 26, 35, 55, 56, 72, 81, 91, 108, or 359) and C.I. Solvent Blue (36, 63, 83, 105, or 111).

In the coloring particles, the content ratio of the dye is preferably at least 5 parts by mass and no greater than 80 parts by mass relative to 100 parts by mass of the polyester resin, and more preferably at least 15 parts by mass and no greater than 45 parts by mass.

The content ratio of the dye in the ink of the present disclosure is preferably at least 0.5% by mass and no greater than 5.0% by mass, and more preferably at least 1.5% by mass and no greater than 3.0% by mass.

(Shell Layers)

The shell layers contain the specific resin with the non-ring-opened oxazoline group and the amide ester group. The specific resin is covalently bonded to the polyester resin contained in the cores, for example. The shell layers are formed by processing the cores with a polymer with the non-ring-opened oxazoline group, for example. In detail, by processing the cores with the polymer with the non-ring-opened oxazoline group, the polymer with the non-ring-opened oxazoline group covers the cores and the covalent bond is formed between the non-ring-opened oxazoline group in the polymer with the non-ring-opened oxazoline group and the carboxy group contained in the polyester resins in the cores. As a result, the shell layers are formed.

In the coloring particles, the content ratio of the shell layers is preferably at least 1 part by mass and no greater than 20 parts by mass relative to 100 parts by mass of the cores, and more preferably at least 5 parts by mass and no greater than 10 parts by mass.

(Specific Resin)

The specific resin preferably includes a first repeating unit (may be referred to in the following as a repeating unit (1)) represented below by general formula (A) and a second repeating unit (may be referred to in the following as a repeating unit (2)) represented below by general formula (B)).

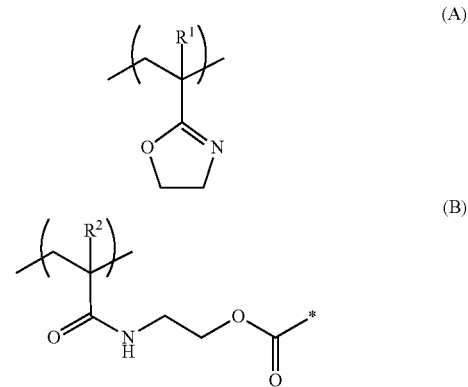

In general formula (A), $R^1$ represents a hydrogen atom or an alkyl group with a carbon number of at least 1 and no greater than 10 that may be substituted with a phenyl group. In general formula (B), $R^2$ represents a hydrogen atom or an alkyl group with a carbon number of at least 1 and no greater than 10 that may be substituted with a phenyl group. The asterisk represents a bonding site with an atom present in the polyester resin contained in the cores.

In general formula (A) or general formula (B), examples of the alkyl group with a carbon number of at least 1 and no greater than 10 that may be represented by $R^1$ or $R^2$ include a methyl group, an ethyl group, an n-propyl group, an isopropyl group, an n-butyl group, a sec-butyl group, a tert-butyl group, an n-pentyl group, an isopentyl group, a neopentyl group, a 1,2-dimethyl propyl group, a straight- or branched-chain hexyl group, a straight- or branched-chain heptyl group, a straight- or branched-chain octyl group, a straight- or branched-chain nonyl group, and a straight- or branched-chain decyl group.

In general formula (A), $R^1$ preferably represents a hydrogen atom, a methyl group, an ethyl group, or an isopropyl group. In general formula (B), $R^2$ preferably represents a hydrogen atom, a methyl group, an ethyl group, or an isopropyl group.

The specific resin may further include a repeating unit (maybe referred to in the following as a repeating unit (3)) derived from a vinyl compound. Here, the vinyl compound is a compound with a vinyl group ($CH_2$=$CH$—) or a compound with a substituted vinyl group (group in which at least one hydrogen atom in the vinyl group has been substituted). Examples of the vinyl compound include ethylene, propylene, butadiene, vinyl chloride, (meth)acrylic acid, (meth)acrylic ester (preferably, alkyl (meth)acrylate), acrylonitrile, and styrene.

Preferably, the specific resin further includes a repeating unit derived from alkyl (meth)acrylate or a repeating unit derived from styrene as the repeating unit (3).

The specific resin preferably includes only the repeating unit (1), the repeating unit (2), and the repeating unit (3). However, the specific resin may further contain a repeating unit other than the repeating unit (1), the repeating unit (2), and the repeating unit (3).

[Coloring Particle Production Method]

Examples of a coloring particle production method include a production method that features a core formation process of kneading and pulverizing the polyester resin and the dye, and a shell layer formation process of forming the shell layers by reacting the obtained cores with the polymer with the non-ring-opened oxazoline group in the aqueous medium.

(Core Formation Process)

In the present process, the polyester resin and the dye are mixed. Next, the obtained mixture is melt-kneaded using a melt-kneader (e.g., a single-screw or double-screw extruder). Next, the obtained kneaded product is pulverized. Through the above, cores containing the polyester resin and the dye are obtained. The cores may be dispersed in the aqueous medium before the shell layer formation process, if necessary.

Note that examples of another method to form the cores include a method of mixing the polyester resin and the dye while dissolving them in an organic solvent (e.g., ethyl acetate or methyl ethyl ketone), and a method of dissolving the dye in a solution containing a monomer of the polyester resin and then polymerizing the monomer. However, the method of forming the cores by pulverization and kneading as described above is preferable because it inhibits the occurrence of a phenomenon in which only the dye separates and recrystallizes when the cores are dispersed in an aqueous medium.

(Shell Layer Formation Process)

In the present process, the cores obtained by the core formation process and the polymer with the non-ring-opened oxazoline group are allowed to react in the aqueous medium. The polymer with the non-ring-opened oxazoline group has the above-described repeating unit (1), for example. By having the repeating unit (1) which has a highly hydrophilic oxazoline group, the polymer with the non-ring-opened oxazoline group is highly hydrophilic. As such, the polymer with the non-ring-opened oxazoline group easily dissolves in the aqueous medium, and easily reacts with the cores in the aqueous medium. Preferably, the polymer with the non-ring-opened oxazoline group further includes the above-described repeating unit (3). By further having the repeating unit (3) that is relatively high in hydrophobicity, the polymer with the non-ring-opened oxazoline group displays amphipathicity. The amphipathic polymer with the non-ring-opened oxazoline group also functions as a dispersant and can react with the cores even in an aqueous medium with no dispersant (e.g., surfactant) or organic solvent.

For example, "EPOCROS (registered Japanese trademark) WS-300" or "EPOCROS (registered Japanese trademark) WS-700", products of NIPPON SHOKUBAI, can be used as a solution containing the aqueous medium and the polymer with the non-ring-opened oxazoline group (may be referred to in the following as a shell layer formation solution). EPOCROS (registered Japanese trademark) WS-300 contains a copolymer of 2-vinyl-2-oxazoline and methyl methacrylate (polymer with the non-ring-opened oxazoline group). The content ratio of the monomers constituting the copolymer is (2-vinyl-2-oxazoline):(methyl methacrylate)=9:1. EPOCROS (registered Japanese trademark) WS-700 contains a copolymer of 2-vinyl-2-oxazoline, methyl methacrylate, and butyl acrylate (polymer with the non-ring-opened oxazoline group). The content ratio of the monomers constituting the copolymer is (2-vinyl-2-oxazoline):(methyl methacrylate):(butyl acrylate)=5:4:1. 2-Vinyl-2-oxazoline is a compound represented by the following chemical formula (A-1).

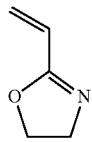

(A-1)

The following describes a mixing method of the cores and the shell layer formation solution in detail. In the mixing of the cores and the shell layer formation solution, the mixed solution is preferably heated. A temperature that is at least the temperature at which the oxazoline group of the polymer with the non-ring-opened oxazoline group reacts with the carboxy group of the polyester resin to form an amide ester group is preferable as the heating temperature. Specifically, the heating temperature is at least 70° C. and no higher than 100° C., for example. By mixing the cores with the shell layer formation solution, shell layers are formed on the surfaces of the cores. As a result, a coloring particle dispersion containing the coloring particles and the aqueous medium can be obtained.

In the present process, the addition amount of the polymer with the non-ring-opened oxazoline group is preferably at least 1 part by mass and no greater than 20 parts by mass relative to 100 parts by mass of the cores, and more preferably at least 5 parts by mass and no greater than 10 parts by mass.

[Aqueous Medium]

The aqueous medium contained in the ink of the present disclosure is a medium including water. The aqueous medium may function as a solvent, or may function as a dispersion medium. Specific examples of the aqueous medium include an aqueous medium containing only water and an aqueous medium containing water and a water-soluble organic solvent.

The content ratio of the water in the ink of the present disclosure is preferably at least 30.0% by mass and no greater than 80.0% by mass, and more preferably at least 40.0% by mass and no greater than 60.0% by mass. By setting the content ratio of the water to at least 30.0% by mass and no greater than 80.0% by mass, the ejection stability of the ink of the present disclosure can be further improved.

Examples of the water-soluble organic solvent contained in the ink of the present disclosure include glycol compounds, polyhydric alcohol ether compounds, lactam compounds, nitrogen-containing compounds, acetate compounds, thiodiglycol, glycerin, and dimethyl sulfoxide.

Examples of the glycol compounds include ethylene glycol, 1,3-propanediol, propylene glycol, diethylene glycol, triethylene glycol, and tetraethylene glycol.

Examples of the polyhydric alcohol ether compounds include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, and propylene glycol monomethyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide Examples of the acetate compounds include diethylene glycol monoethyl ether acetate.

The water-soluble organic solvent contained in the ink of the present disclosure is preferably a glycol compound or glycerin, and more preferably propylene glycol or glycerin.

The content ratio of the water-soluble organic solvent in the ink of the present disclosure is preferably at least 10.0% by mass and no greater than 60.0% by mass, and more preferably at least 20.0% by mass and no greater than 40.0% by mass. By setting the content ratio of the water-soluble organic solvent to at least 10.0% by mass and no greater than 60.0% by mass, the ejection stability of the ink of the present disclosure can be further improved.

[Surfactant]

Preferably, the ink of the present disclosure further contains a surfactant. The surfactant improves the permeability (wettability) of the ink of the present disclosure on a textile printing target. Examples of the surfactant include an anionic surfactant, a cationic surfactant, and a nonionic surfactant. The surfactant is preferably the nonionic surfactant.

Examples of the nonionic surfactant include polyoxyethylene dodecyl ether, polyoxyethylene hexadecyl ether, polyoxyethylene nonylphenyl ether, polyoxyethylene sorbitan monooleate ether, sucrose monodecanoate, and an ethylene oxide adduct of acetylene glycol. The nonionic surfactant is preferably an ethylene oxide adduct of acetylene glycol.

When the ink of the present disclosure contains a surfactant, the content ratio of the surfactant in the ink of the present disclosure is preferably at least 0.05% by mass and no greater than 3.0% by mass, and more preferably at least 0.2% by mass and no greater than 1.0% by mass.

[Other Components]

The ink of the present disclosure may further contain a known additive (specific examples include a solution stabilizer, an anti-drying agent, an antioxidant, a viscosity modifier, a pH adjuster, and an antifungal agent) as necessary.

[Ink Production Method]

The ink of the present disclosure is for example produced by mixing the coloring particle dispersion containing coloring particles and water, the water-soluble organic solvent, and an additional component as necessary (e.g., surfactant) using a stirrer. The mixing time is at least 1 minute and no longer than 30 minutes, for example. In the production of the ink of the present disclosure, after the components have been uniformly mixed, foreign objects and coarse particles may be removed using a filter (e.g., a 5 μm-pore size filter).

EXAMPLES

The following describes Examples of the present disclosure. However, the present disclosure is not limited to the following Examples.

In Examples, a measurement value of volume median diameter ($D_{50}$) is a value measured using a dynamic light scattering type particle size distribution analyzer ("ZETA-SIZER NANO ZS", product of Malvern Instruments Ltd.).

[Polyester Resin Synthesis]

(Polyester Resin (R-1))

A four-necked flask equipped with a distillation tube, a nitrogen inlet tube, a thermometer, and a stirrer was used as a reaction vessel. First, 1 part by mass of zinc acetate as a reaction catalyst and 500 parts by mass of dimethyl terephthalate, 50 parts by mass of 5-sodium sulfoisophthalic acid, 300 parts by mass of ethylene glycol, and 700 parts by mass of bisphenol A propylene oxide adduct as the first materials were charged to the reaction vessel. Next, the temperature of the contents of the reaction vessel was raised to 130° C. Next, the temperature of the contents of the reaction vessel was raised from 130° C. to 170° C. over 2 hours. This resulted in an ester exchange reaction. Next, while the temperature of the contents of the reaction vessel was kept at 170° C., 450 parts by mass of isophthalic acid as the second material and 1 part by mass of antimony trioxide were added into the reaction vessel. Next, the temperature of the contents of the reaction vessel was raised from 170° C. to 200° C. over 2 hours. This resulted in an esterification reaction. Next, the inside of the reaction vessel was gradually depressurized until the air pressure in the reaction vessel reached 666.6 Pa while gradually raising the temperature of the contents of the reaction vessel to 250° C. After the temperature of the contents of the reaction vessel reached 250° C. and the air pressure in the reaction vessel reached 666.6 Pa, the temperature and the air pressure was kept for 1 hour. This resulted in a polycondensation reaction. As a result, a polyester resin (R-1) was obtained.

(Polyester Resins (R-2) to (R-4))

Polyester resins (R-2) to (R-4) were synthesized by the same method as the synthesis of the polyester resin (R-1) in all aspects other than the changes of the types and addition amounts of the first and second materials to those shown below in Table 1. In Table 1, "DMT", "NDCN", "SSPIA", "BPO-PO", "EG", and "IPA" respectively refer to dimethyl terephthalate, dimethyl 2,6-naphthalene dicarboxylate, sodium 5-sulfoisophthalate, bisphenol A propylene oxide adduct, ethylene glycol, and isophthalic acid.

The glass transition point and the melting point of each polyester resin (R-1) to (R-4) were measured in accordance with Japanese Industrial Standard (JIS) K7121-2012 using a differential scanning calorimeter ("DSC-60", product of Shimadzu Corporation). The polyester resins (R-1) to (R-4) had the glass transition points shown below in Table 1. By contrast, no clear melting point was measured for the polyester resins (R-1) to (R-4). That is, the polyester resins (R-1) to (R-4) were all non-crystalline polyester resins.

TABLE 1

|  |  |  | R-1 | R-2 | R-3 | R-4 |
|---|---|---|---|---|---|---|
| Material [parts by mass] | 1st material | DMT | 500 | 500 | 500 | 500 |
|  |  | NDCN | — | — | — | 500 |
|  |  | SSPIA | 50 | 100 | 150 | 150 |
|  |  | BPO-PO | 700 | 700 | 700 | 700 |
|  |  | EG | 300 | 300 | 300 | 300 |
|  | 2nd material | IPA | 450 | 400 | 350 | 350 |
| Glass transition point [° C.] |  |  | 50 | 52 | 54 | 64 |

[Coloring Particle Dispersion Preparation]

Coloring particle dispersions (A-1) to (A-12) were prepared by the following method. First, the dyes and the shell layer formation solutions used in the preparation of the coloring particle dispersions are shown in the following.

(Dye)

Dye (D-1): "DISPERSE BLUE 359", product of Santa Cruz Biotechnology Inc.

Dye (D-2): "DISPERSE YELLOW 54", product of Santa Cruz Biotechnology Inc.

Dye (D-3): "DISPERSE RED 60", product of Santa Cruz Biotechnology Inc.

(Shell Layer Formation Solution)

Shell layer formation solution (S-1): emulsion containing a copolymer (water-soluble cross-linking agent) of 2-vinyl-2-oxazoline and methyl methacrylate ("EPOCROS (registered Japanese trademark) WS-300", product of NIPPON SHOKUBAI CO., LTD.), solid concentration 10%

Shell layer formation solution (S-2): emulsion containing a copolymer (water-soluble cross-linking agent) of 2-vinyl-2-oxazoline, methyl methacrylate, and butyl acrylate ("EPOCROS (registered Japanese trademark) WS-700", product of NIPPON SHOKUBAI CO., LTD.), solid concentration 25%

Shell layer formation solution (S-3): emulsion containing styrene-acrylic resin with an oxazoline group ("EPOCROS (registered Japanese trademark) K-2020E", product of NIPPON SHOKUBAI CO., LTD.), solid concentration 40%

Shell layer formation solution (S-4): solution containing polycarbodiimide with hydrophilic segments ("CARBODILITE (registered Japanese trademark) V-04", product of Nisshinbo Chemical Inc.), solid concentration 40%

(Coloring Particle Dispersion (A-1))

First, 100 parts by mass of the polyester resin (R-1) and 25 parts by mass of the dye (D-1) were mixed using a high-speed mixer. First kneading was performed on the obtained mixture using a kneader ("KH-2-S", product of INOUE MFG., INC.) under conditions of a rotational speed of 100 rpm and a temperature of 85° C. Second kneading was performed on a first kneaded product obtained through the first kneading using a twin screw extruder ("PCM-30", product of Ikegai Corp.) under conditions of a material feeding speed of 5 kg/hour, an axial speed of 150 rpm, and a cylinder temperature of 150° C.

After a second kneaded product obtained through the second kneading had been cooled, the second kneaded product was finely pulverized using a pulverizer ("TURBO MILL Type RS", product of FREUND-TURBO CORPORATION). Through the above, cores containing a polyester resin and a dye were obtained.

Then, 200 g of the cores (composition: 160 g of the polyester resin (R-1) and 40 g of the dye (D-1)), 700 g of ion exchange water, and 100 g of ethylene glycol monobutyl ether as a water-soluble organic solvent were charged to a four-necked flask equipped with a thermocouple. Next, the contents of the four-necked flask were mixed for 2 hours at a stirring speed of 10,000 rpm and a temperature of 90° C. using a thin-film slewing high-speed mixer ("FILMIX (registered Japanese trademark) 40-L", product of PRIMIX Corporation). Then, a core dispersion was obtained by cooling the contents of the four-necked flask to room temperature while stirring the contents.

A three-necked flask equipped with a thermometer and a stirring impeller was used as a reaction vessel. Then, 100 g of the core dispersion was charged to the reaction vessel. Next, the temperature of the contents of the reaction vessel was kept at 30° C. using a water bath. Next, 14 g of the shell layer formation solution (S-1) (1.4 g of solid content) was charged to the reaction vessel, and the contents of the reaction vessel were thoroughly stirred. Next, the contents of the reaction vessel were stirred for 1 hour at a speed of 150 rpm. Next, 100 g of ion exchange water was charged to the reaction vessel. Next, the temperature of the contents of the reaction vessel was raised to 80° C. at a heating rate of 0.5° C./minute while stirring the contents of the reaction vessel at 250 rpm. Next, the contents of the reaction vessel were stirred for 1 hour at 250 rpm while keeping the temperature of the contents of the reaction vessel at 80° C. Next, the contents of the reaction vessel were cooled to normal temperature. Through the above, a coloring particle dispersion (A-1) was obtained.

(Coloring Particle Dispersions (A-2) to (A-12))

Coloring particle dispersions (A-2) to (A-12) were prepared through the same method as the preparation of the coloring particle dispersion (A-1) in all aspects other than the following changes. In the preparation of the coloring particle dispersions (A-2) to (A-12), the type of polyester resin, the type of dye, the addition amount of ion exchange water, the type and addition amount of water-soluble organic solvent, and the type and addition amount of shell layer formation solution were changed so as to match the compositions shown below in Tables 2 and 3. Note that in the preparation of the coloring particle dispersion (A-11), shell layer formation was not performed. That is, the core dispersion of the composition shown in Table 3 was used directly as the coloring particle dispersion (A-11).

In Tables 2 and 3, "EGBE", "MEK", and "IPA" respectively refer to ethylene glycol monobutyl ether, methyl ethyl ketone, and isopropyl alcohol.

TABLE 2

| | Coloring particle dispersion | | A-1 | A-2 | A-3 | A-4 | A-5 | A-6 |
|---|---|---|---|---|---|---|---|---|
| Core dispersion | Polyester resin | Type | R-1 | R-2 | R-3 | R-4 | R-3 | R-1 |
| | | Parts by mass | 16 | 16 | 16 | 16 | 16 | 16 |
| | Dye | Type | D-1 | D-1 | D-1 | D-1 | D-1 | D-1 |
| | | Parts by mass | 4 | 4 | 4 | 4 | 4 | 4 |
| | EGBE [parts by mass] | | 10 | 7 | 5 | 5 | — | — |
| | MEK [parts by mass] | | — | — | — | — | 5 | — |
| | IPA [parts by mass] | | — | — | — | — | — | 10 |
| | Ion exchange water [parts by mass] | | 70 | 73 | 75 | 75 | 75 | 70 |
| | Total [parts by mass] | | 100 | 100 | 100 | 100 | 100 | 100 |
| Shell layer formation solution | Type | | S-1 | S-1 | S-1 | S-1 | S-1 | S-1 |
| | Parts by mass | | 14 | 14 | 14 | 14 | 14 | 14 |
| | Ion exchange water [parts by mass] | | 100 | 100 | 100 | 100 | 100 | 100 |

TABLE 3

| | Coloring particle | | A-7 | A-8 | A-9 | A-10 | A-11 | A-12 |
|---|---|---|---|---|---|---|---|---|
| Core dispersion | Polyester resin | Type | R-1 | R-1 | R-1 | R-1 | R-1 | R-1 |
| | | Parts by mass | 16 | 16 | 16 | 16 | 16 | 16 |
| | Dye | Type | D-2 | D-3 | D-1 | D-1 | D-1 | D-1 |
| | | Parts by mass | 4 | 4 | 4 | 4 | 4 | 4 |
| | EGBE [parts by mass] | | 10 | 10 | 10 | 10 | 10 | 10 |
| | MEK [parts by mass] | | — | — | — | — | — | — |
| | IPA [parts by mass] | | — | — | — | — | — | — |
| | Ion exchange water [parts by mass] | | 70 | 70 | 70 | 70 | 70 | 70 |
| | Total [parts by mass] | | 100 | 100 | 100 | 100 | 100 | 100 |
| Shell layer formation solution | | Type | S-1 | S-1 | S-2 | S-3 | — | S-4 |
| | | Parts by mass | 14 | 14 | 8 | 12 | — | 3 |
| | Ion exchange water [parts by mass] | | 100 | 100 | 100 | 100 | 100 | 100 |

[Ink Preparation]

Through the following method, inks (I-1) to (I-10) used in Examples and inks (I-11) to (I-13) used in Comparative Examples were prepared.

(Ink (I-1))

First, 100 g of the coloring particle dispersion (A-1) (coloring particles 10% by mass), 20 g of propylene glycol, 20 g of glycerin, and 0.5 g of a nonionic surfactant ("SURFYNOL (registered Japanese trademark) 104", product of Nissin Chemical Industry Co., Ltd) were mixed and the obtained mixture was filtered using a filter with a pore size of 5 μm (filtration processing). Through the above, the ink (I-1) was obtained. The ink (I-1) had a viscosity of 6.0 mPa·s.

(Inks (I-2) to (I-12))

The inks (I-2) to (I-12) were prepared by the same method as the preparation of the ink (I-1) in all aspects other than the changes of the type of coloring particle dispersion to those shown below in Table 4.

(Ink (I-13))

First, 10.0 g (1.0 g in terms of solid content) of a pigment dispersion containing a disperse dye ("TB-416 Yellow", product of Dainichiseika Color & Chemicals Mfg. Co., Ltd.), 20.0 g of propylene glycol, 20.0 g of glycerin, 0.5 g of a nonionic surfactant ("SURFYNOL (registered Japanese trademark) 104", product of Nissin Chemical Industry Co., Ltd) were added to 49.5 g of ion exchange water to adjust the total amount of the obtained mixture to 100.0 g. The obtained mixture was filtered using a 5 μm-pore size filter (filtration processing). Through the above, the ink (I-13) which was a yellow ink was obtained.

(Dispersibility)

Dispersibility of the inks (I-1) to (I-13) was determined based on the state of the above filtration process. In detail, the occurrence or non-occurrence of clogging in the 5 μm-pore size filter was identified in the filtration processing of each ink. The 5 μm-pore size filter was also visually inspected after the filtration processing. Ink dispersibility was determined based on the following criteria. The determination results are shown below in Table 4.

(Dispersibility Criteria)

A (good): No coarse particles remaining on filter, or some coarse particles remaining on filter but filter clogging has not occurred.

B (poor): Coarse particles remaining in filter and filter clogging has occurred.

(Volume Median Diameter Measurement)

The respective volume median diameters ($D_{50}$) of the coloring particles and the dye contained in each of the inks (I-1) to (I-13) were measured. The measurement results are shown below in Table 4.

(Non-Ring-Opened Oxazoline Group Amount Measurement)

The amount of a non-ring-opened oxazoline group (Ox group) contained in 1 g of ink for each of the inks (I-1) to (I-13) was measured through the following method. The measurement results are shown below in Table 4.

A gas chromatograph mass spectrometer ("GCMS-QP2010 ULTRA", product of Shimadzu Corporation) and a multi-shot pyrolyzer ("FRONTIER LAB MULTI-FUNCTIONAL PYROLYZER (registered Japanese trademark) PY-3030D", product of Frontier Laboratories Ltd.) were used as measuring devices. A GC column ("AGILENT (registered Japanese trademark) J&W ULTRA INERT CAPILLARY GC COLUMNS DB-5 ms", product of Agilent Technologies Japan, Ltd., phase: allylene phase in which allylene has been introduced to siloxane polymer to strengthen polymer chain, inner diameter: 0.25 mm, film thickness: 0.25 μm, length: 30 m) was used as a column.

(Gas Chromatography)

Carrier gas: helium (He) gas

Carrier flow rate: 1 mL/minute

Gasification chamber temperature: 210° C.

Thermal decomposition temperature: 600° C. for furnace, 320° C. for interface

Column oven temperature conditions: After being kept at 40° C. for 3 minutes, the temperature was raised from 40° C. to 300° C. at a rate of 10° C./minute and kept at 300° C. for 15 minutes.

(Mass Spectrography)
Ionization method: electron impact (EI)
Ion source temperature: 200° C.
Interface temperature: 320° C.
Detection mode: scan (measurement range: 45 m/z to 500 m/z)

By analyzing a mass spectrum measured under the above conditions, a peak derived from the non-ring-opened oxazoline group was specified. The amount of the non-ring-opened oxazoline group contained in 1 g of the measurement target (ink) was determined based on the peak area of the specified peak. A calibration curve based on a reference material was used for quantification.

<Evaluation>

With respect to each of the inks (I-1) to (I-13), the ejection stability and washing fastness of textile prints formed using the ink were evaluated through the following methods. The evaluation results are shown below in Table 4.

[Ejection Stability]

An inkjet textile printing apparatus (prototype produced by KYOCERA Document Solutions Inc.) including 4-line recording heads ("KJ4B-QA", product of KYOCERA Inc., 2656 nozzles) and a conveyor belt was used as an evaluation apparatus. The recording heads were long and orthogonal to the conveyance direction of a textile printing target in the longitudinal direction thereof. The conveyor belt of the evaluation apparatus included a suction unit which applied negative pressure to the textile printing target being conveyed to adhere the textile printing target to the conveyor belt. One of the recording heads of the evaluation apparatus was loaded with an evaluation target (one of the inks (I-1) to (I-13)). Next, the ejection conditions of the recording heads were set such that the ejection amount of the ink per ink droplet was 10.5 pL. Next, the negative pressure of the suction unit was set to 0.6 kPa.

Using the evaluation apparatus, a solid image was continuously formed for 30 minutes (continuous textile printing processing) over the entire surfaces of printing targets (TETORON (registered Japanese trademark) pongee fabric with polyester fibers). Thereafter, the evaluation apparatus was left to stand for 10 minutes. After 10 minutes, a nozzle check pattern was formed using the evaluation apparatus. Through the above, the presence or absence of non-ejecting nozzles resulted from the continuous textile printing processing was confirmed. The ejection stability of the ink was determined based on the following criteria.

(Ejection Stability Criteria)
A (good): 0 to 3 non-ejecting nozzles
B (poor): more than 4 non-ejecting nozzles

[Washing Fastness]

Using the evaluation apparatus, a solid image was formed over the entire surface of a textile printing target (TETORON (registered Japanese trademark) pongee fabric with polyester fibers). Next, the textile printing target with the solid image formed thereon was heated for 60 seconds at 180° C. Through the above, a textile print in which the polyester fibers and the ink had been integrated was obtained.

Color fastness testing was performed on the above textile print in accordance with Japan Industrial Standards (JIS) L 0844:2011. In detail, an aqueous solution (soap concentration: 5 g/L) containing soap ("Shabondama Soap Powder", product of Shabondama Soap Co., Ltd.) was first prepared as a washing liquid. Next, after the textile print was washed with the above washing liquid using a laboratory washing machine, a degree of fading of the textile print was determined using the greyscale for fading specified in Japan Industrial Standards (JIS) L 0804:2004. In detail, the degree of fading in the textile print was determined to be one of 9 levels: level 1, level 1-2, level 2, level 2-3, level 3, level 3-4, level 4, level 4-5, or level 5. In the above determination, level 1 indicates the highest degree of fading, while level 5 indicates the lowest degree of fading. Washing fastness was determined based on the following criteria.

(Washing Fastness Criteria)
A (good): degree of fading at level 4, 4-5, or 5
B (poor): degree of fading at level 3 or 3-4
C (particularly poor): degree of fading at level 1, 1-2, 2, or 2-3

TABLE 4

| | Example | | | | | | | | | | Comparative Example | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Ink | I-1 | I-2 | I-3 | I-4 | I-5 | I-6 | I-7 | I-8 | I-9 | I-10 | I-11 | I-12 | I-13 |
| Coloring particle dispersion | A-1 | A-2 | A-3 | A-4 | A-5 | A-6 | A-7 | A-8 | A-9 | A-10 | A-11 | A-12 | A-13 |
| Ox group [μmol/g] | 49 | 45 | 44 | 45 | 49 | 49 | 47 | 49 | 47 | 51 | — | — | — |
| $D_{50}$ [nm] | 170 | 140 | 120 | 140 | 160 | 170 | 170 | 170 | 160 | 180 | 150 | 200 | 110 |
| Dispersibility | A | A | A | A | A | A | A | A | A | A | A | B | A |
| Ejection stability | A | A | A | A | A | A | A | A | A | A | A | B | A |
| Color fastness | A | A | A | A | A | A | A | A | A | A | B | B | B |

The inks (I-1) to (I-10) of Examples 1 to 10 each contained coloring particles and the aqueous medium. Each coloring particle included the core and the shell layer covering the core. The core contained the polyester resin and the dye. The shell layer contained the specific resin with the non-ring-opened oxazoline group and the amide ester group. Each of the inks (I-1) to (I-10) of Examples 1 to 10 had excellent ejection stability and a textile print with excellent washing fastness was formed with the ink.

By contrast, each of the inks (I-11) to (I-13) of Comparative Examples 1 to 3 did not fulfill the above features. Therefore, the ink had inferior ejection stability or the textile print with excellent washing fastness was not formed with the ink.

In detail, the coloring particles of the ink (I-11) of Comparative Example 1 included no shell layers. The textile print formed with the ink (I-11) of Comparative Example 1 was determined to have poor washing fastness because the dye eluted from the cores of the coloring particles.

The shell layers of the ink (I-12) of Comparative Example 2 did not contain the specific resin. The ink (I-12) of Comparative Example 2 was determined not to include coloring particles having a stable core-shell structure. As a result, the ink (I-12) of Comparative Example 2 had inferior ejection stability and the textile print with excellent washing fastness was not formed with the ink.

The ink (I-13) of Comparative Example 3 used a disperse dye instead of coloring particles. Therefore, the textile print with excellent washing fastness was not formed with the ink.

What is claimed is:

1. An inkjet textile printing ink comprising:
   coloring particles; and
   an aqueous medium, wherein
   the coloring particles each include a core and a shell layer covering the core,
   the core contains a polyester resin and a dye,
   the shell layer contains a specific resin with a non-ring-opened oxazoline group and an amide ester group,
   the specific resin is covalently bonded to the polyester resin, and
   the non-ring-opened oxazoline group has a content ratio as measured through gas chromatograph mass spectrography of at least 30 µmol/g and no greater than 100 µmol/g.

2. The inkjet textile printing ink according to claim 1, wherein
   the polyester resin includes a non-crystalline polyester resin.

3. The inkjet textile printing ink according to claim 1, wherein
   the coloring particles have a volume median diameter of at least 20 nm and no greater than 300 nm.

4. The inkjet textile printing ink according to claim 1, wherein
   the specific resin includes a first repeating unit represented by a general formula (A) and a second repeating unit represented by a general formula (B),

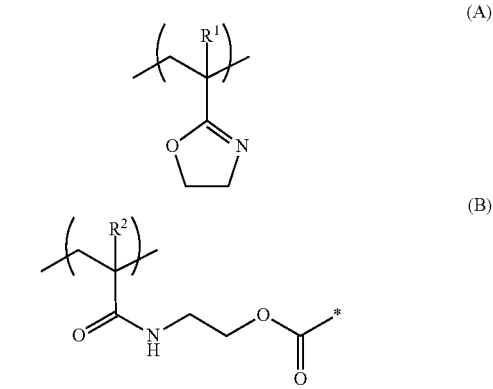

where in general formula (A), $R^1$ represents a hydrogen atom or an alkyl group with a carbon number of at least 1 and no more than 10 that may be substituted with a phenyl group, and
in general formula (B), $R^2$ represents a hydrogen atom or an alkyl group with a carbon number of at least 1 and no more than 10 that may be substituted with a phenyl group, and an asterisk represents a bonding site to an atom present in the polyester resin contained in the core.

5. The inkjet textile printing ink according to claim 1, wherein
   the non-ring-opened oxazoline group has a content ratio as measured through gas chromatography-mass spectrometry of at least 40 µmol/g and no greater than 60 µmol/g.

6. The inkjet textile printing ink according to claim 2, wherein
   the non-crystalline polyester resin has a content ratio in the cores of at least 50.0% by mass and no greater than 90.0% by mass.

7. The inkjet ink according to claim 2, wherein
   the non-crystalline polyester resin has a content ratio in the cores of at least 70.0% by mass and no greater than 85.0% by mass.

* * * * *